June 30, 1942.  M. RUIZ  2,288,488
APPARATUS FOR PHOTOGRAPHING TITLES ON MOTION PICTURE FILMS
Filed Jan. 2, 1941  4 Sheets-Sheet 3
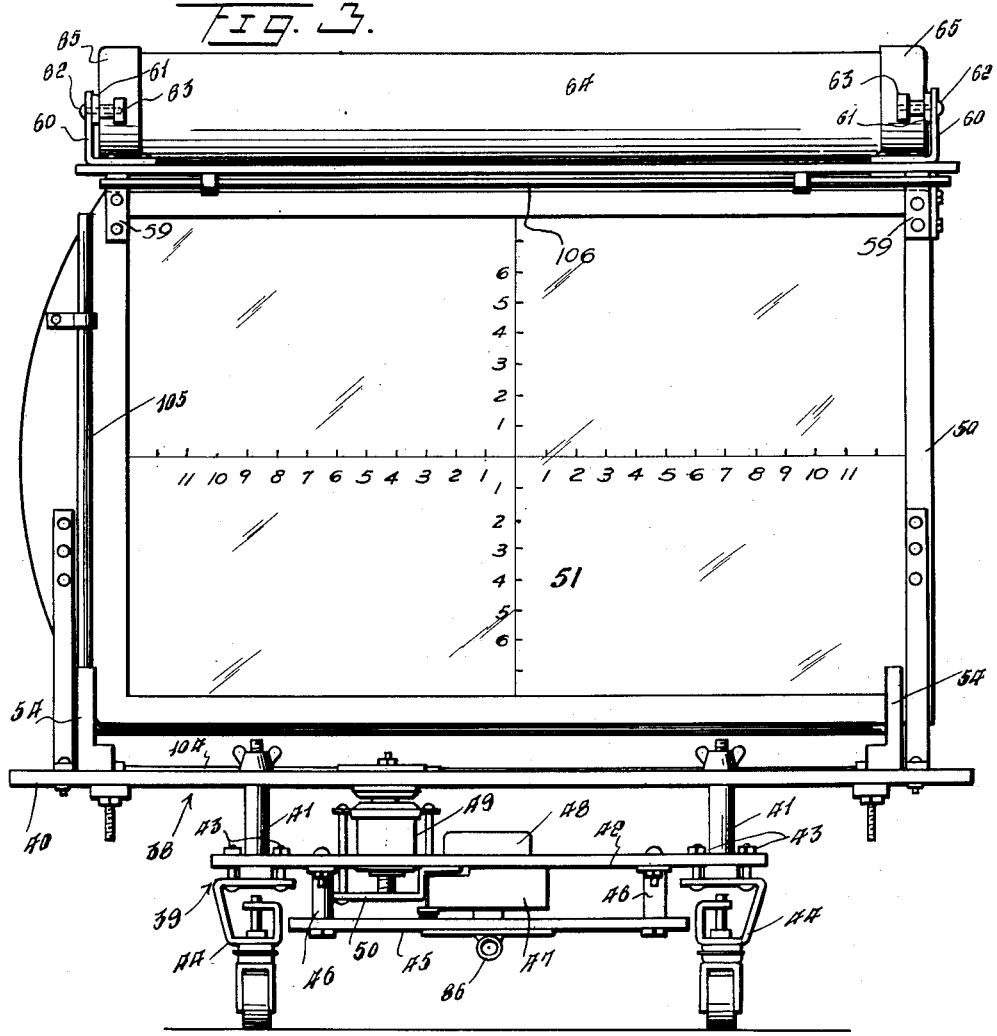
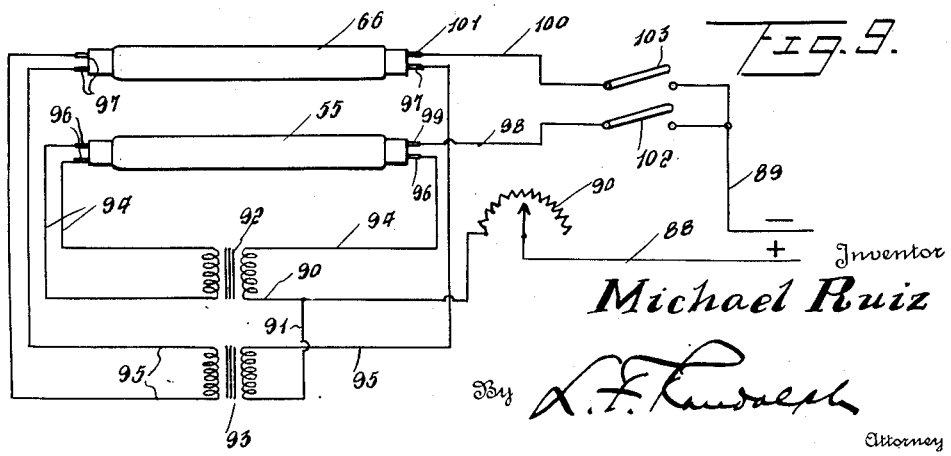
Inventor
Michael Ruiz
By L. F. Randolph
Attorney June 30, 1942.  M. RUIZ  2,288,488
APPARATUS FOR PHOTOGRAPHING TITLES ON MOTION PICTURE FILMS
Filed Jan. 2, 1941  4 Sheets-Sheet 4
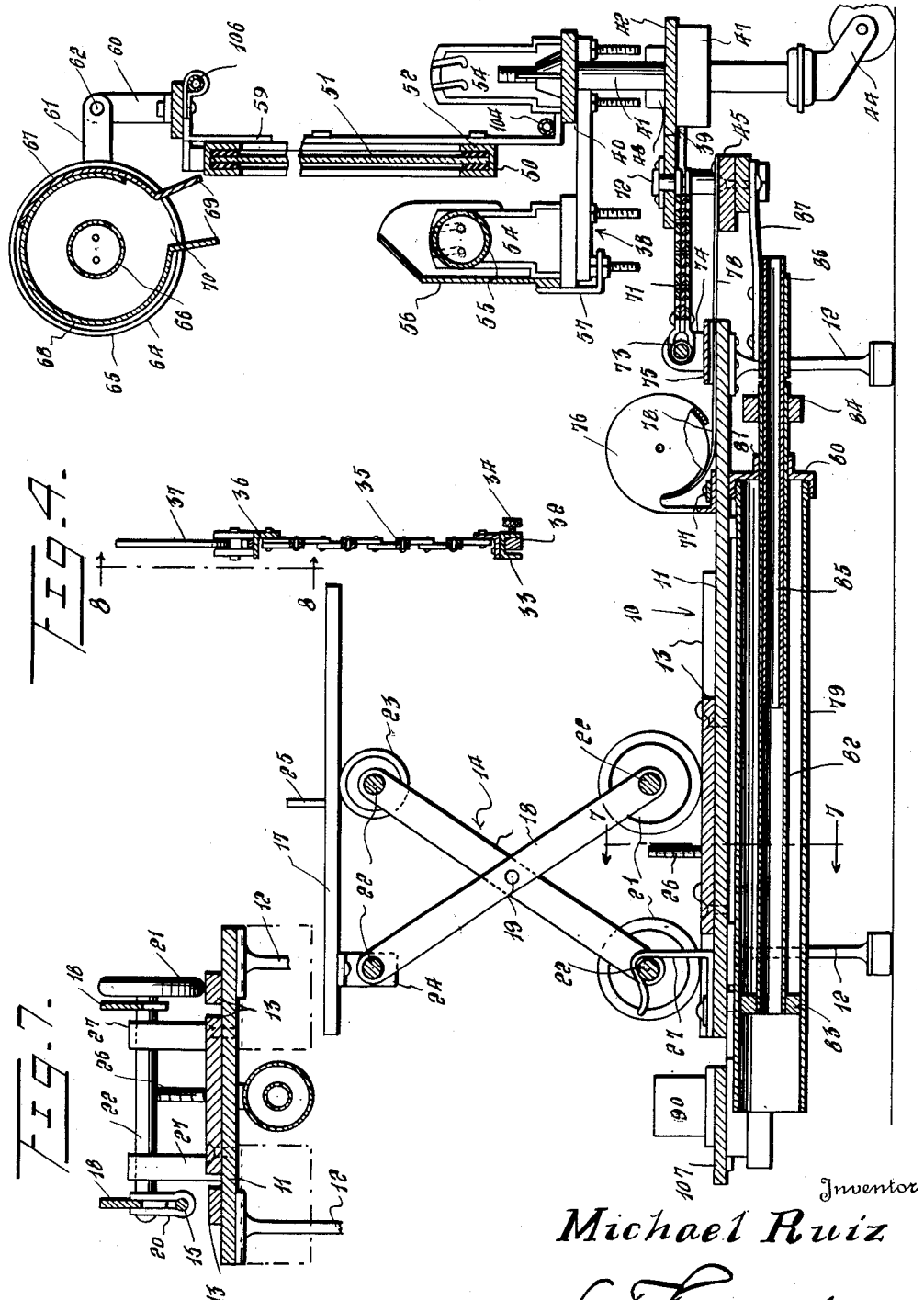
Inventor
Michael Ruiz
By L. F. Landreth
Attorney Patented June 30, 1942

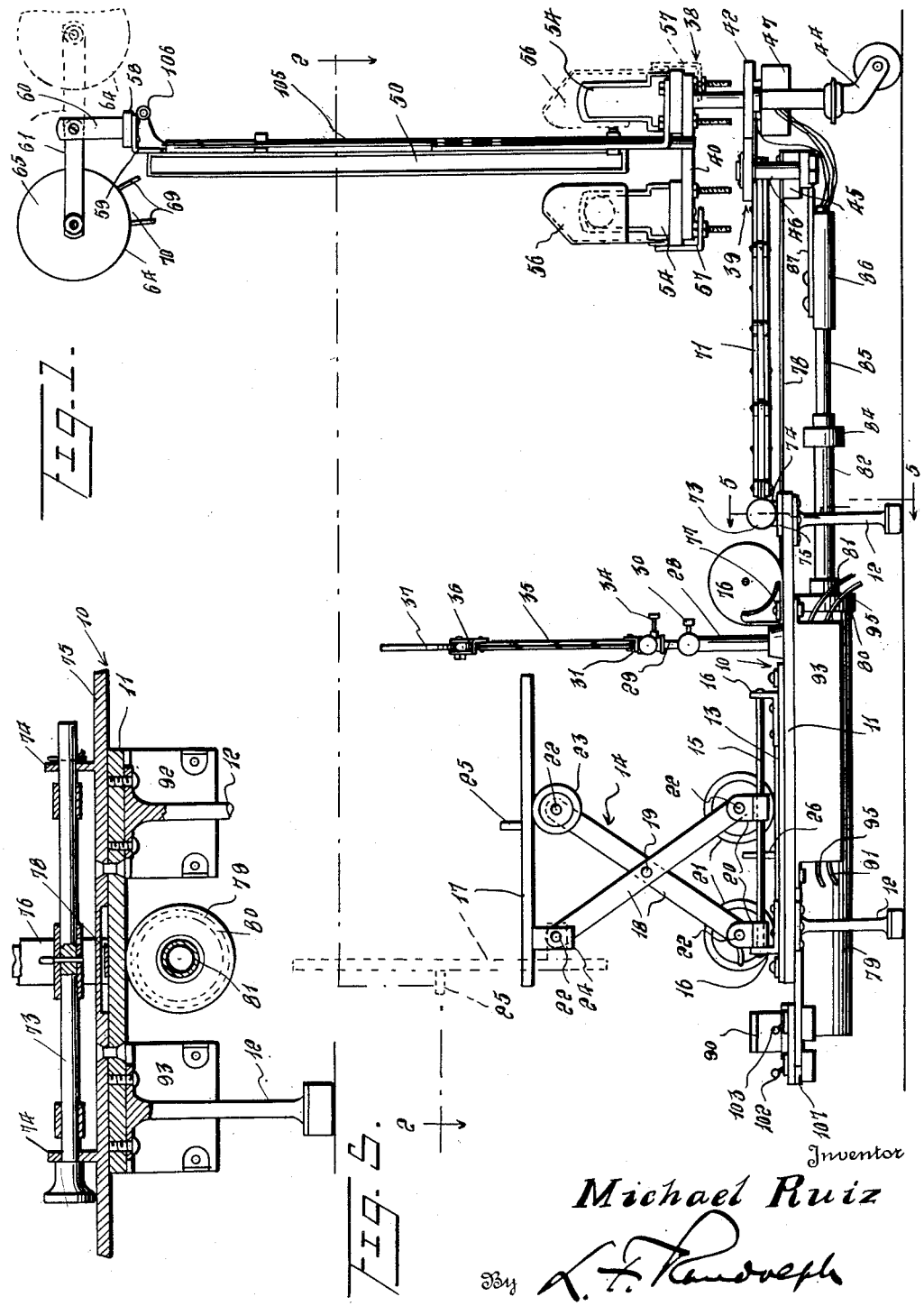

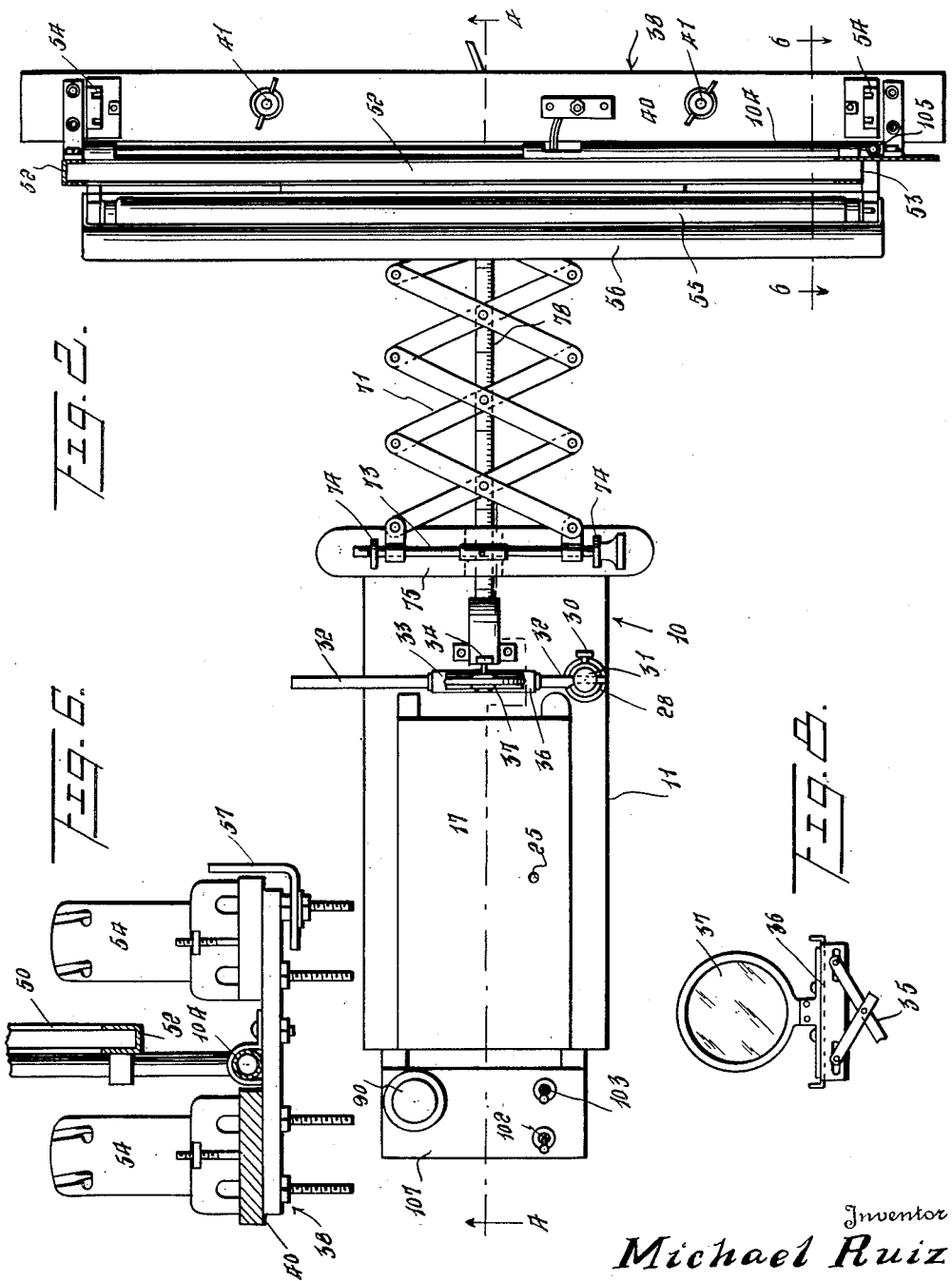

2,288,488

UNITED STATES PATENT OFFICE 2,288,488

APPARATUS FOR PHOTOGRAPHING TITLES ON MOTION PICTURE FILMS

Michael Ruiz, Chicago, Ill.

Application January 2, 1941, Serial No. 372,903

6 Claims. (Cl. 88—24)

This invention relates to an improved apparatus for use in photographing titles on motion picture films and aims particularly to provide a device capable of use with many types of motion picture cameras and provided with means for accurately adjusting the device for producing a correct field of view for different types of cameras and having means for accurately positioning a title to be photographed in the field of view of the camera.

More particularly, it is an aim of the invention to provide means including an easel having gauge means for accurately adjusting the easel relatively to a support for a camera whereby the easel may be correctly positioned so that the field of view of the camera mounted on the camera support will correspond to the dimensions of the subjects to be photographed.

Still a further aim of the invention is to provide a title photographing apparatus having an auxiliary lens disposed between the camera and subject to be photographed, and means for adjustably supporting said lens for correctly positioning it for cameras of different types.

Another object of the invention is to provide novel means for illuminating the titles in view of the front or back of the easel and means for manually varying the intensity of the illumination.

Other objects and advantages of the invention will hereinafter become more fully apparent from the following description of the drawings, which illustrate a preferred embodiment thereof, and wherein:

Figure 1 is a side elevational view of the apparatus,

Figure 2 is a longitudinal horizontal sectional view taken substantially along the plane of the line 2—2 of Figure 1, Figure 3 is an end view in elevation of the apparatus looking toward the end thereof provided with the easel, Figure 4 is a longitudinal vertical sectional view taken substantially along the plane of the line 4—4 of Figure 2, Figure 5 is an enlarged transverse vertical sectional view taken substantially along the plane of the line 5—5 of Figure 1, Figure 6 is a vertical sectional view, on an enlarged scale, taken substantially along the plane of the line 6—6 of Figure 2, with the reflector removed, Figure 7 is a vertical sectional view taken substantially along the plane of the line 7—7 of Figure 4, Figure 8 is a transverse vertical sectional view taken substantially along the plane of the line 8—8 of Figure 4, and Figure 9 is a diagrammatic view of the electric circuit of the illuminating means.

Referring more particularly to the drawings, wherein like reference characters designate like or corresponding parts throughout the different views, 10 designates generally the apparatus in its entirety and including a base 11 supported by legs 12. A plate 13 is secured to the upper side of the base 11, adjacent its rear end, to provide a support for an adjustable camera stand 14.

The camera stand 14 includes a rod 15 which is supported above and longitudinally of the plate 13 by means of the brackets 16. The camera stand 14 includes a platform 17 which is mounted by pairs of crossed legs 18, the legs of each of which pairs are pivotally connected, intermediate of their ends, at 19. The lower ends of the legs 18 of one of the pairs are provided with loop or sleeve portions 20 which are slidably mounted on the rod 15 while the lower ends of the legs of the other pair are provided with wheels 21 mounted on axles 22 which extend through complementary ends of the corresponding legs 18 of the two pairs. The upper ends of the legs of both pairs are similarly connected by axles 22. Wheels 23 are mounted on the ends of the upper, forward axle 22. The platform 17, adjacent its rear end is provided with a pair of depending bearing members 24 which are loosely connected to the ends of the upper, rear axle 22 to pivotally connect the platform 17 to the upwardly and rearwardly extending legs 18 of each of the pairs. The wheels 23 are adapted to engage the underside of the forward portion of the platform 17 to combine with the bearings 24 to normally support the platform in substantially a horizontal position above the base 11, as seen in Figure 4. A stud 25 is secured to and projects upwardly from the platform 17 and a similar stud 26 is secured to and projects upwardly from the plate 13. By means of the connection, as heretofore described, the platform 17 can be moved from a horizontal position, as seen in full lines of Figure 1, to an upright or vertical position as seen in dotted lines thereof, for a purpose which will hereinafter become apparent. The stand 14 is prevented from moving longitudinally of the base 11 by means of a pair of spring clips 27 which are secured thereto and which engage over the lower rear axle 22 so that when the forward wheel 21 moves relatively to the base 11 and the forward loop 20 moves relatively to the base 11 on the rod 15 the legs 18 will be folded or extended to raise or lower the platform 17 to limit the movement of the platform 17 to a perpendicular direction. During this movement, the wheels 23 will move relatively to the underside of the platform 17.

A tubular post 28 is secured to and rises from the base 11, adjacent one side thereof, and forwardly of the stand 14. A rod 29 is slidably mounted in the post 28 and is adapted to be extended relatively thereto and secured in any one of a number of extended positions by means of a set screw 30 carried by the post 28. The rod 29 is provided with a head 31 on its upper end to which is secured a bar 32 which is disposed substantially at a right angle to the rod 29 and in substantially a horizontal plane. A slide 33, having an inverted channel shaped portion which is mounted on the rod 32, is adjustably mounted relatively to the bar 32 and is adapted to be secured in any one of a plurality of adjusted positions by means of a set screw 34. A lazy tongs 35 is connected at its lower end to the slide 33 and at its upper end to a lens support 36 on which is mounted an auxiliary lens 37.

Referring particularly to Figures 1, 3 and 4, a frame, designated generally 38 includes a truck, designated generally 39 and a supporting bar 40 which is mounted above the truck 39 and in spaced apart relationship thereto by means of the fastenings 41. The truck 39 includes a bar 42 to the ends of which the lower ends of the fastenings 41 are connected by means of fastenings 43, which last mentioned fastenings also connect a pair of casters 44 to the under side of the bar 42 to provide a wheeled support for the frame 38. A bar 45 is hung beneath the bar 42 by fastenings or hangers 46. An electrical socket 47 is secured to the bar 42 and is disposed partially above and partially beneath said bars and is provided with a plug or male portion 48 which is disposed above the bar 42. An electrical connection 49 is mounted by a bracket 50 on the bar 42 and is disposed between said bar and the bar 40. The electrical connection 49 likewise includes a socket portion and a plug portion. An easel 50 is mounted on the bar 40 and extends substantially from end to end thereof and projects upwardly therefrom. In Figure 3, a centering card 51 is shown mounted in the easel 50, for a purpose which will hereinafter be explained. The top and bottom and one end of the easel 50 are channel shaped in cross section, as seen at 52 in Figure 2, for receiving and holding the centering card 51 and/or a title or subject to be photographed, not shown. The opposite end 53 of the easel 50 is open for applying or removing the article to be mounted in the easel. A pair of electric lamp sockets 54 are mounted on each side of the easel 50 and adjacent the bottom thereof, said lamp sockets 50 being secured to and projecting upwardly from the bar 40 adjacent the ends thereof. The lamp sockets 54 are of conventional construction and of the type adapted for mounting a conventional fluorescent or day light lamp bulb 55 of the type which is provided with a pair of contact points at each end thereof. One of such lamp bulbs 55, as shown, in Figure 2, is mounted in front of the easel 50 and connected to the forward pair of sockets 54. Each of the pairs of sockets 54 is provided with a reflector 56 which is detachably connected to the sockets 54 by means of brackets 57. The reflectors 56 open inwardly or toward the easel 50 for directing the rays of light from lamp bulbs 55 mounted in the pairs of sockets 54 onto the card holder 51, for a purpose which will hereinafter become apparent.

A bar 58 is supported above and longitudinally of the easel 50 by means of angle arms 59 which are fastened at opposite ends respectively to the bar 58 and to the easel 50. A post or standard 60 is secured to and rises from the bar 58 adjacent each of its ends. A supporting arm 61 is pivotally connected to each of the standards 60, and said arms 61 each being connected at one end to the upper end of the standard 60, as best seen in Figures 1 and 4. The arms 61 are pivotally mounted by means of screws or bolts 62, as best seen in Figure 3, which carry thumb nuts 63 which are adapted to be tightened for clamping the arms 61 in a plurality of adjusted positions. A reflector 64, of the barrel type, is connected at its ends to the free ends of the arms 61 and disposed therebetween. The reflector 64 includes the caps 65 forming the ends thereof which are provided with inwardly projecting lamp sockets, not shown, similar to the lamp sockets 54 for mounting a lamp bulb 66, corresponding to the lamp bulbs 55, in the reflector 64. As best seen in Figure 4, the reflector 64 is provided with the arcuately shaped body portions 67 and 68, the ends of which are slidably mounted in the caps 65. The portions 67 and 68 are provided with corresponding outwardly projecting flanges 69, at adjacent edges thereof, forming an elongated opening 70 for the passage of the light rays from the bulb 66. The portions 67 and 68 may be turned relatively to the caps 65 for varying the position of the opening 70, which opening is adapted to be disposed for directing the light ray downwardly and inwardly toward the centering card 51. The portions 67 and 68 are likewise adapted to be turned relatively to each other for varying the width of the opening 70. As will be apparent, arms 61 may be moved to change the reflector 64 from its full line position, as seen in Figure 1, to its dotted line position, so that the light rays from the bulb 66 may be directed onto the back of the centering card 51.

A lazy tongs 71 is slidably connected at one of its ends at 72 to the bar 42 and is slidably connected at its opposite end to a rod 73 which is supported by means of brackets 74 on a plate 75 which is secured to the upper side of the forward end of the base 11 and transversely thereof. A housing 76 is secured at 77 to the upper side of the base 11 adjacent its forward end and contains a spring winding reel, not shown, for a flexible ruler 78 which is wound thereon. One end of the ruler 78 extends outwardly through an opening in the bottom of the housing 76 and forwardly between the plate 75 and the base 11 and is connected at the free end thereof to the bar 45, as best seen in Figures 1 and 4. As best seen in Figure 2, the rule 78 is calibrated or marked in inches on its upper side for indicating the distance between the base 11 and the frame 38 and to thereby provide means whereby the frame 38 may be accurately adjusted relatively to the base 11 for a purpose which will hereinafter become apparent. The lazy tongs 71 provides a connection between the base 11 and the frame 38 whereby the frame may be moved toward and away from the base 11.

A tube 79, as best seen in Figures 4 and 7, is secured beneath and longitudinally of the base 11, and is provided at one end with a cap 80 which is threadedly connected to the tube and which is provided with a centrally disposed flange opening 81. A sleeve 82 is slidably mounted intermediate of its ends, in the flanged opening 81. The end of the sleeve 82 which is disposed in the tube 79 is provided with a collar or washer 83 which slidably engages the inner side of the tube 79 for guiding said end of the sleeve 82 and for retaining it in alinement with the flanged opening 81. A collar 84 is mounted on the opposite, outer end of the sleeve 82 for engaging the flanged opening 81 for limiting the inward movement of the sleeve 82 relatively to the tube 79. A sleeve 85 has one end slidably mounted in the sleeve 82 and is provided with a collar 86 on its opposite, exposed end for limiting the inward movement of the sleeve 85 relatively to the sleeve 82. A rigid metal strap 87 is secured at one end to the collar 86 and at its opposite end to the underside of the bar 45 to provide an additional connection between the base 11 and the frame 38 and to provide a substantially rigid support for maintaining the frame 38 in an upright position. The frictional engagement between the sleeves 82 and 85 is greater than that between the sleeve 82 and the tube 79 so that when the frame 38 is moved to an extended position relatively to the base 11 the sleeve 82 will be extended fully relatively to the tube 79 before the tube 85 begins to move to an extended position relatively to the tube 79 to thereby provide the maximum strength for maintaining the parts in a horizontal position and thereby maintain the frame 38 in a perpendicular position. The tube 79 and the sleeves 82 and 85 provide a telescopic conduit for electrical conductors, as seen in Figure 1, which lead to the lamp bulbs 55 and 66, as will hereinafter be more fully described.

Referring to the diagrammatic view, Figure 9, 88 designates generally a positive conductor wire leading from a source of electric current, not shown, such as a conventional outlet box, and 89 designates a negative return wire. A rheostat 90 is interposed in the positive wire 88, which, beyond said rheostat is provided with branch wires 90 and 91 which lead to transformers 92 and 93, respectively. Three positive wires 94 and 95 lead from each of the transformers 92 and 93, respectively. The three conductor wires 94 connect with the three positive contact points 96 of the lamp bulb 55 through the pair of lamp sockets 54 in which said bulb is mounted, and it is to be understood that the conductors are connected to both pairs of lamp sockets 54 and that the lamp bulb 55 is adapted to be transferred from one to the other of the pairs of lamp sockets for positioning it either in front of or behind the easel 50. The conductor wires 95 connect with the three positive contacts 97 of the lamp bulb 66, through the lamp sockets, not shown, carried by the reflector 64. A conductor wire 98 leads from a negative point 99 of the lamp bulb 55 through one of either of the pairs of lamp sockets 54 and a conductor 100 similarly extends from the negative contact point 101 of the lamp bulb 66. The opposite ends of the conductors 98 and 100 connect with the negative return wire 89 and said conductors, intermediate of their ends, are provided with corresponding switches 102 and 103, respectively, for selectively energizing the lamp bulbs 55 and 66. It will thus be seen that the lamp bulbs 55 and 66 may be selectively energized when illuminating the easel 50 and the intensity of the illumination may be uniformly controlled by means of the rheostat 90. This is true whether the lamp bulb 55 and 66 are disposed in front of the easel 50, as shown in full lines of Figure 1, or transferred to the back of the easel, as shown in dotted lines in Figure 1, by moving the arms 61 to their dotted line positions and by transferring the lamp bulb 55 from the front pair of lamp sockets 54 to the rear pair.

The conductors 95 and 100 of the upper lamp 66 extend through the plug and socket 47, 48 and the conductors 94 and 98 similarly pass through the plug and socket connection 49 so that the portions of said connections may be separated, as for example, where it is desirable to detach the bar 40 from the bar 42 for any reason. All of these conductors lead through a conduit 104, mounted behind the base of the easel 50 to adjacent the lamp sockets 54 and the conductors of the lamp bulbs 66 extend upwardly through a conduit 105 to one end of the lamp bulb 66 through a horizontal conduit 106, at the top of the easel 50 to the other end of the lamp bulb 66.

The base 11 at its rear end is provided with an extension 107 on which is mounted the rheostat 90 and the switches 102 and 103.

Assuming that it is desired to photograph a title on a film of a motion picture camera such as a Ciné-Kodak, Revere, Victor, Univex, Bolex and other cameras of the same type, the platform 17 is arranged in a horizontal position as seen in full lines of Figure 1, and the camera placed thereon with its tripod socket connected to the pin 25. The stand 14 is then raised or lowered to adjust the elevation of the platform 17 so that the lens of the camera mounted thereon, not shown, will be in horizontal alinement with the center of the centering card 51. If it is necessary to provide means for reducing the focus of the camera, the auxiliary lens 37 is adjusted, in the manner as heretofore explained, to position it in front of the lens of the camera. The card on which is imprinted the title to be photographed is then attached to the centering card 51 on the side thereof adjacent the lens 37 in a centered position relatively to the centering card 51, which is provided with crossed, calibrated, vertical and horizontal lines, not shown, for properly centering the title card. The frame 38 is then adjusted relatively to the base 11 and accurately positioned by reference to the rule 78 to position the easel 50 at the proper distance from the auxiliary lens 37 so that the field of view of the camera will correspond to the dimensions of the title card. For example, assuming that a size 16 m. m. F. 3.5 camera is mounted on the platform 17 and the size of the title card, not shown, is six and one-quarter inches by eight and one-quarter inches, the frame 38 is adjusted so that the title card in the easel 50 is exactly 21 inches from the lens 37 at which position the field of view of the camera will correspond to the size of the title card. Title cards of other sizes may be used by increasing the distance between the title card and the auxiliary lens 37 and with the camera of above referred to size a title ten and one-quarter inches by thirteen and one-half inches may be photographed by positioning the title thirty-four inches from the auxiliary lens. Obviously, pictures, such as cuts from magazines may similarly be photographed in lieu of titles. In photographing a title on the front of the centering card 51, the lamp bulbs 55 and 66 are positioned to the front of the easel 50 for flooding the front of the centering card and title with light by closing the switches 102 and 103 after which the rheostat 80 may be adjusted to secure proper intensity of the illumination. When the apparatus 10 is employed for photographing titles on films with cameras such as Keystone, Bell-Howell, Filmo and other cameras of this type, the platform 17 is swung to its dotted line position, as seen in Figure 1, and the tripod socket of the camera, not shown, is connected to the pin 26. The lens 37 is then adjusted to position it in front of the lens of the camera after which the title is filmed, in the same manner as heretofore explained for cameras mounted on the platform 17. Where the auxiliary lens 37 is not used, it is moved downwardly to a retracted position after which the bar 32 is swung to a position longitudinally of the apparatus 10 to position the lens 37 at one side of the base 11.

Titles may also be photographed which are printed on a transparent title card such as a sheet of Cellophane, in which case the centering card 51 is cut to form an opening in the center thereof corresponding to the dimensions of the field of view of the camera into which the title card is secured over said opening. The lamps 55 and 66 are moved to positions behind the easel 50, as heretofore explained, and illuminated to illuminate the back of the centering card 51 to cause the light to shine through the transparent title card so that the opaque letters printed thereon will stand out in relief and may be readily photographed.

Various modifications and changes are contemplated and may obviously be resorted to as only a preferred embodiment of the invention has been disclosed.

I claim as my invention:

1. A device of the class described comprising a base, a support having a platform at its top provided with means for detachably mounting a camera thereon, said support being slidably connected to the base and constructed so that sliding movement thereof will raise or lower the support in substantially a vertical plane, a wheeled frame, means for connecting the frame and base whereby the frame may be moved toward and away from the base, an easel supported by the frame for mounting a subject to be photographed by the camera, an auxiliary focusing lens adjustably mounted between the support and easel and arranged for movement horizontally and vertically, and illuminating means associated with the easel for flooding the subject to be photographed.

2. A device as in claim 1, said auxiliary focusing lens including a support for said lens, said support having means for adjusting the elevation of the lens and the angle of the lens relatively to the easel.

3. A device as in claim 1, said illuminating means including lamp bulbs provided with reflectors for illuminating the front or back of the subject mounted in the easel, said illuminating means being disposed adjacent the top and bottom of the easel.

4. A device as in claim 1, said means for connecting the frame and base comprising telescoping tubular members connected respectively to the base and frame and forming a conduit for electric wiring leading to said illuminating means.

5. A device as in claim 1, said camera support including legs for supporting the platform relatively to the base and for positioning the platform at different elevations relatively to the base, and means for pivotally connecting the platform to said supporting legs.

6. An apparatus for use in photographing titles on motion picture films, comprising a stationary base, a frame, extensible means connecting the base and frame, an easel mounted on the frame for supporting a title to be photographed, means mounted on the base for mounting a motion picture camera at different elevations relatively to the base, and an auxiliary focusing lens mounted on the base, between the camera mounting means and easel, said lens being adjustable horizontally and vertically, illuminating means for illuminating the title to be photographed, said illuminating means comprising pairs of sockets disposed on either side of the easel, lamp bulbs mounted in said sockets, reflectors for said lamp bulbs detachably connected to the sockets, a pair of lamp sockets adjustably mounted above easel, a lamp bulb carried by said last mentioned pair of sockets, an adjustable reflector for said last mentioned lamp bulb, said last mentioned pair of sockets being movable from a position in front of said easel to a position behind the easel, and means for selectively energizing either of the first mentioned lamp bulbs in combination with the last mentioned lamp bulbs for illuminating the title from either side of the easel.

MICHAEL RUIZ.